United States Patent
Sprunger

(10) Patent No.: US 6,672,894 B2
(45) Date of Patent: Jan. 6, 2004

(54) FLEXIBLE INTERCONNECT CABLE STRAIN RELIEF FACILITY

(75) Inventor: Paul Sprunger, Dundee, OR (US)

(73) Assignee: Ludlow Company LP, Chicopee, MA (US)

( * ) Notice: Subject to any disclaimer, the term of this patent is extended or adjusted under 35 U.S.C. 154(b) by 0 days.

(21) Appl. No.: 10/055,488

(22) Filed: Jan. 22, 2002

(65) Prior Publication Data

US 2003/0139087 A1 Jul. 24, 2003

(51) Int. Cl.[7] .............................. H01R 13/58
(52) U.S. Cl. ............... 439/449; 439/460; 439/578; 439/455; 439/835
(58) Field of Search .................. 439/460, 461, 439/462, 449, 578, 584, 835, 455, 474

(56) References Cited

U.S. PATENT DOCUMENTS

| | | |
|---|---|---|
| 1,201,830 A | 10/1916 | Knauff |
| 2,952,730 A | 9/1960 | Simonds |
| 3,040,288 A | 6/1962 | Edlen et al. |
| 3,136,843 A | 6/1964 | Pomerantz et al. |
| 3,448,430 A | 6/1969 | Kelly |
| 4,293,178 A | 10/1981 | Lee |
| 4,310,213 A * | 1/1982 | Fetterolf, Sr. et al. ...... 339/103 |
| 4,842,548 A | 6/1989 | Bolante |
| 4,854,891 A | 8/1989 | Kamei et al. |
| 5,059,139 A * | 10/1991 | Spinner ................. 439/583 |
| 5,073,129 A * | 12/1991 | Szegda ................. 439/585 |
| 5,123,860 A | 6/1992 | Kamei et al. |
| 5,205,760 A | 4/1993 | Agut Sanz |
| 5,310,963 A | 5/1994 | Kennelly |

* cited by examiner

Primary Examiner—Truc Nguyen
(74) Attorney, Agent, or Firm—Langlotz Patent Works, Inc.; Bennett K. Langlotz

(57) ABSTRACT

A cable assembly includes a cable having a core surrounded by a sheath. A cone element has an interior bore receiving the cable core, and has a tapered exterior surface. At least a portion of the cone is received within the cable sheath. A cup has a tapered bore receiving the sheath and the core. A portion of the sheath is captured between the exterior of the cone and the interior of the cup bore. Tension applied to the cable with respect to cup generates compression of the sheath between the cone and cup, and tension is thus transmitted by the sheath without application of radial force to the core. The sheath may include a strength member such as a braided metal wrap, and an elastic jacket, so that the wrap bears the tension, and the jacket returns the sheath to its normal length upon cessation of tension.

26 Claims, 4 Drawing Sheets

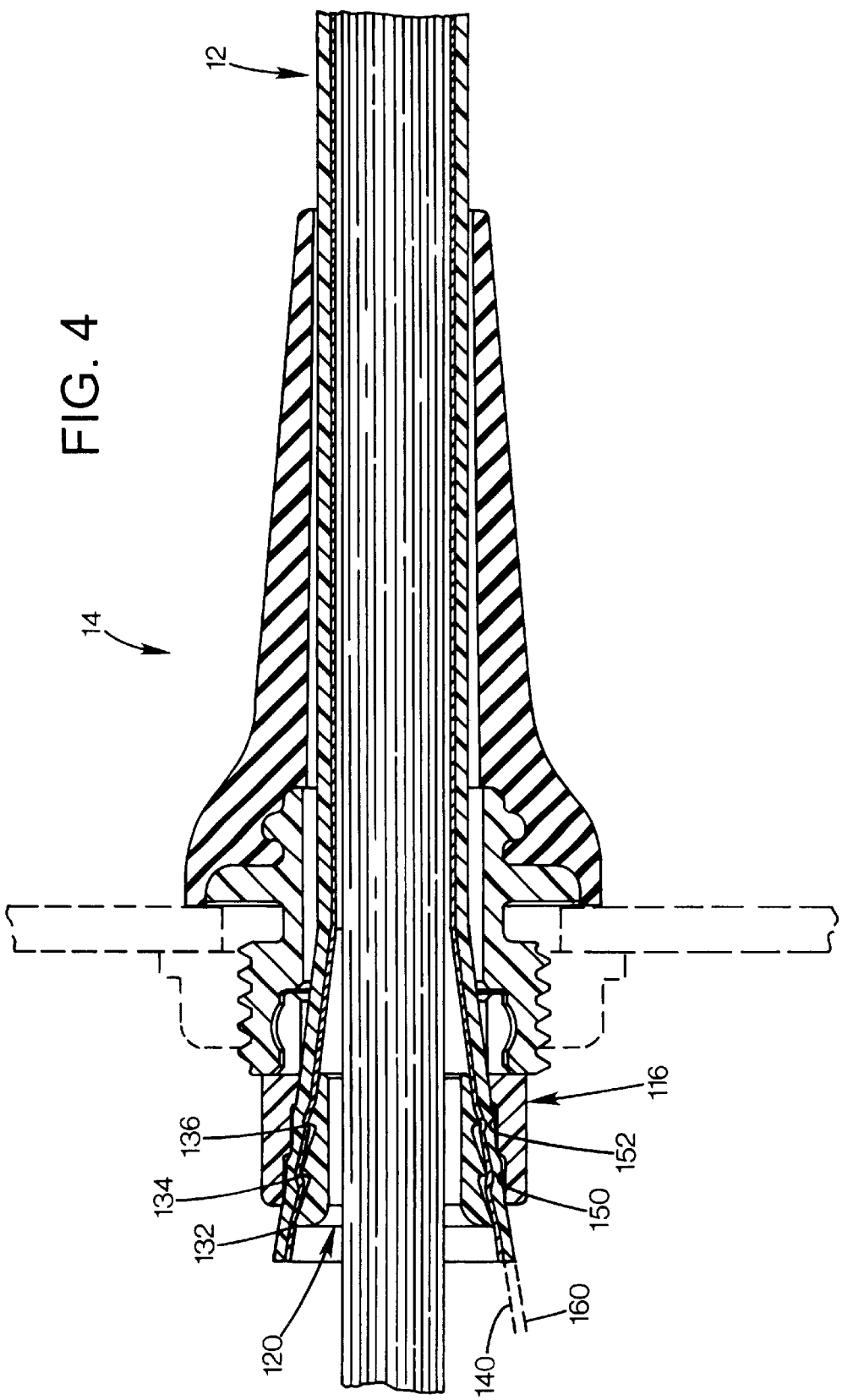

FLEXIBLE INTERCONNECT CABLE STRAIN RELIEF FACILITY

FIELD OF THE INVENTION

This invention relates to electrical cables, and more particularly to strain relief connections at the termination of cables.

BACKGROUND OF THE INVENTION

Flexible electrical cables are used to provide connections between fixed instruments and movable remote devices. For instance, an ultrasound instrument has a transducer unit connected at the free end of a flexible cable. Such cables require flexibility for convenient and comfortable use, and often have a multitude of fine conductors in the cable bundle. In other applications, cables extend between connector housings at each end. Such conductors may be relatively fragile, and subject to damage. Even minor damage can cause wire performance characteristics to deviate from a required range.

In such applications, cables must be able to withstand expected incidents of misuse or accidental tension on the cable. Without adequate provision for strain relief to handle such tension, wires in the cable may transmit the tension to their connections to circuitry in the instrument or remote unit, causing the connections to fail. To avoid this, existing strain relief mechanisms grip the entire cable so that all conductors and a jacket bear the strain in concert, and so that the strain is borne at a cable neck portion away from delicate connections. However, this generates crushing of the wires, which can cause damage. Even without damage, pressure can reduce intended spacing between wires, leading to performance problems due to unintended crosstalk characteristics.

To avoid this, some existing strain relief mechanisms employ tapered cone and cup mechanisms that crimp the cable jacket between the conical outer surface of the cone, and the conical interior bore surface of the cup. However, these systems have at least one of two disadvantages. The first disadvantage is that such systems often have split cone rings that generate permanent compression of the cable bundle, potentially affecting performance, and also reducing cable flexibility as wires are fixed at the mechanism, and unable to slide freely with respect to each other. The second disadvantage is that such tapered cone mechanisms use threaded clamping nuts that are tightened to generate axial force between the cone and cup to pinch the cable jacket. This approach is susceptible to over and under tightening. With under tightening, the clamp may fail when the tension exceeds a threshold; with over tightening, the mechanism or cable components may be damaged.

SUMMARY OF THE INVENTION

The present invention overcomes the limitations of the prior art by providing a cable assembly including a cable having a core surrounded by a sheath. A cone element has an interior bore receiving the cable core, and has a tapered exterior surface. At least a portion of the cone is received within the cable sheath. A cup has a tapered bore receiving the sheath and the core. A portion of the sheath is captured between the exterior of the cone and the interior of the cup bore. Tension applied to the cable with respect to cup generates compression of the sheath between the cone and cup, and tension is thus transmitted by the sheath. Application of a light radial force is applied to the core only when tension is applied to the sheath. Under this condition the sheath tends to both elongate and reduce in diameter until the core of the cable limits further diameter reduction. The sheath may include a strength member such as a braided metal wrap, and an elastic jacket. As the wrap bears the tension it elongates and reduces in diameter, as noted above, until the core of the cable limits further diameter reduction. When the core limits further reduction in diameter the braided metal wrap acts to prevent further elongation and to bear the load. When the tension is released the elastic jacket causes the strength member to retract to its original length, which in turn returns it to its original diameter. This then removes any radial force from the core.

BRIEF DESCRIPTION OF THE DRAWINGS

FIG. 4 is a sectional side view of the embodiment of FIG. 4.

DETAILED DESCRIPTION OF A PREFERRED EMBODIMENT

Figure 1:
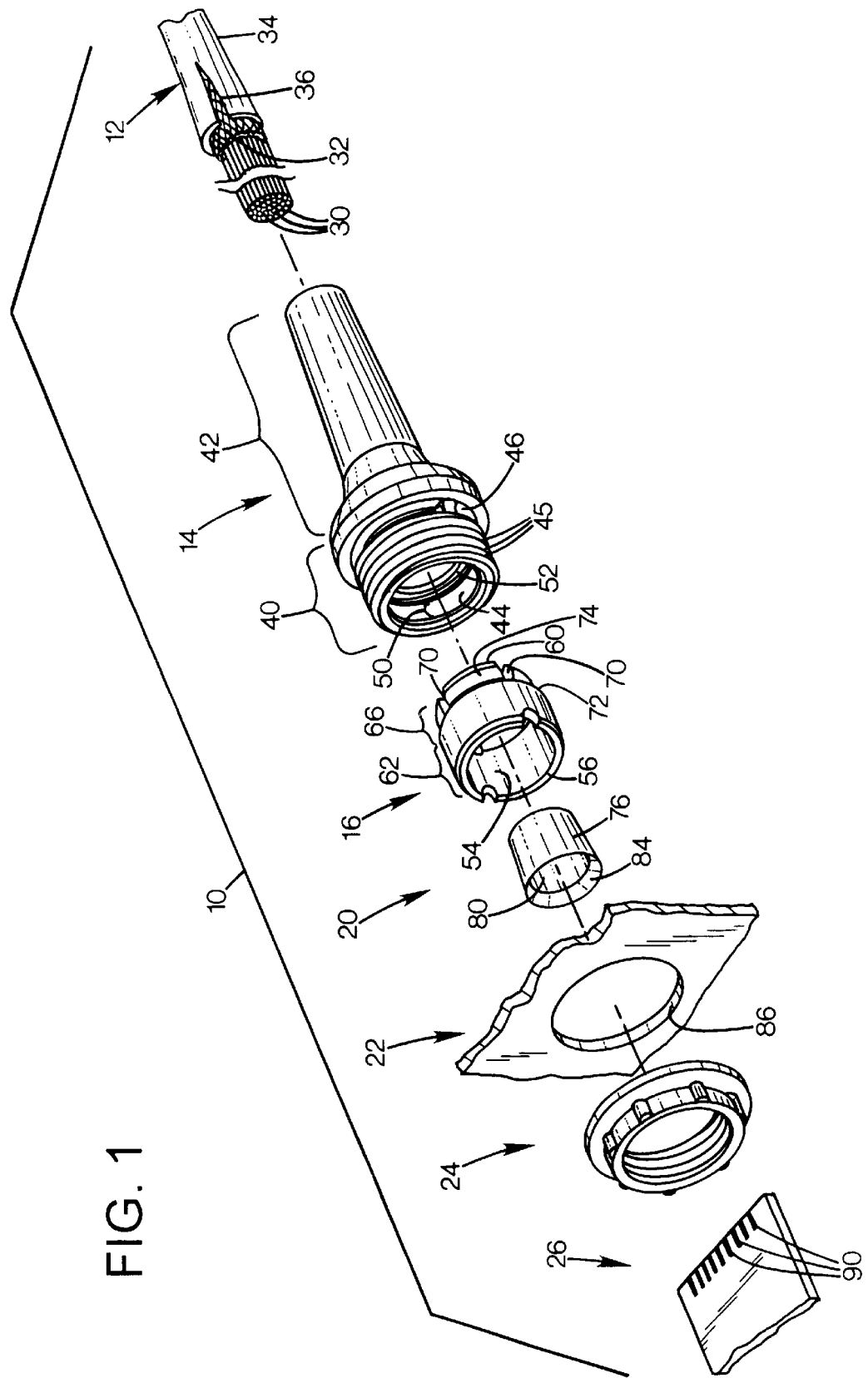
FIG. 1 is an exploded perspective view of a cable terminal assembly according to a preferred embodiment of the invention.

FIG. 1 shows a cable terminal assembly 10 in exploded view. The assembly includes a cable 12, a threaded flex relief element 14, a cup element 16, a cone element 20, a chassis panel 22, a retaining nut 24, and a circuit element 26. As will be discussed below, the cable wires extend through the cone, while the cable jacket is captured between the cone and cup to bear the strain generated by cable tension, so that the wires do not need to bear the strain.

The cable 12 includes core of many wires 30, surrounded by a braided metallic wire shield 32, which is surrounded by a PVC jacket 34 having a pair of opposed slits 36 extending axially for a limited length of the jacket. In the preferred embodiment, the cable includes 144 wires, each a shielded coaxial wire, with a core outside diameter of 0.199". The jacket has a thickness of 0.030", and the jacket and shield together have a thickness of 0.035" under mild compression. In alternative embodiments, the wires may be unshielded, twisted pairs, or ribbonized at least in part. The shield and sheath define an inner bore large enough to loosely receive the bundle of wires, permitting the cable to flex readily with minimal stiffness.

Figure 2:
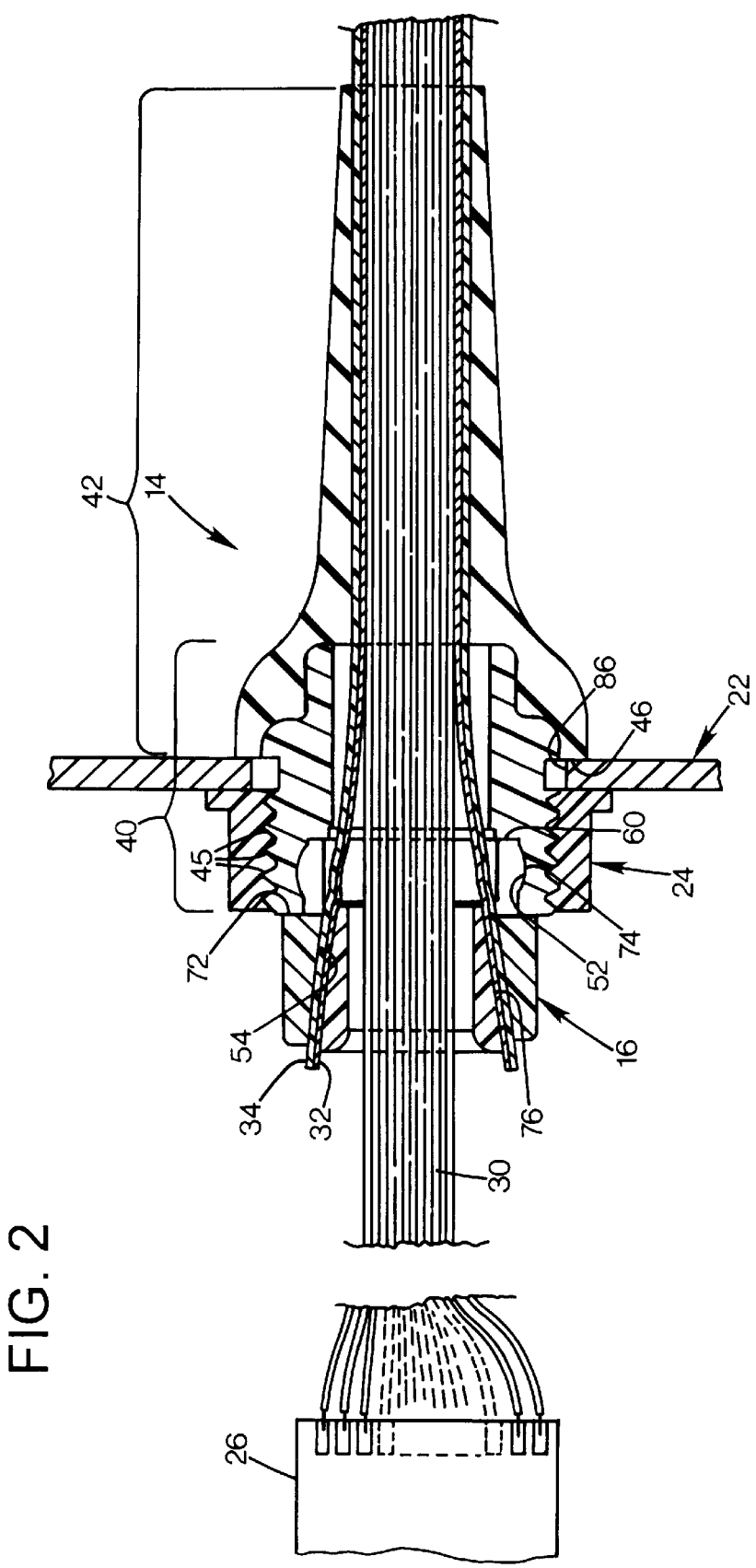
FIG. 2 is a sectional side view of the assembly of FIG. 1.

The flex relief element 14 includes a rigid plastic insert 40, and an integral elastomeric boot 42 over-molded to the insert. The insert is a flanged cylindrical body defining a bore 44. A first end of the insert away from the boot is externally formed with threads 45 to receive the nut 24, and has a flange 46 from which the boot extends. The boot also defines a bore coaxial with the bore of the insert. The insert bore has a straight cylindrical portion 50 at the opening defined by the threaded portion. A circumferential groove 52 is defined in the bore at an intermediate depth in the insert. The groove profile is generally rounded with smooth transitions to the straight portion of the bore, as also illustrated in FIG. 2. The bore of the boot is sized to closely receive the cable, and is tapered as it extends from the insert, providing lessening resistance to bending at the free end, to avoid bending stress concentrations on the cable at the free end of the boot.

The cup 16 is a resilient thermoplastic cylindrical body defining a tapered or frustoconical bore 54. The cup has a first end rim 56 facing away from the strain relief 14, and an opposed second end rim 60. A first portion 62 of the cup at the first end 56 has a straight cylindrical exterior, and is circumferentially continuous. The interior of the first portion is a tapered bore, wider at first end rim 56. A second portion 66 of the cup extends toward the strain relief 14, and is divided into four segments by axial gaps 70. The gaps extend from a shoulder 72 at the rear of the first portion to the second end rim 60. Thus, the four may flex radially inward at their free ends, accommodated by the clearance provided by the gaps. The segments collectively include a circumferential rib 74 near the free ends. The rib is sized to be received in the groove 52 of the insert 40, so that the cup may rotate with respect to the insert, but resist extraction due to the resilience of the segments maintaining the rib in the groove. The segments are adequately flexible to facilitate insertion through bore portion 50 during assembly.

The cone 20 is a resilient thermoplastic cylindrical body having a tapered frustoconical exterior surface 76 and a straight cylindrical interior bore 80. The bore is provided with a chamfer or radius 84 at the larger rim, to avoid a sharp angle that may damage wires passing through the bore.

The chassis panel 22 defines a hole 86 sized to provide clearance with respect to the outside diameter of the threads 45 of the insert 40. The nut 24 is internally threaded to mate with the insert threads, and may be integral with the panel of formed therein in alternative embodiments. In other alternative embodiments, the panel may be formed in two parts in the manner of a clamshell, with a separation line bisecting the hole, permitting the cable assembly to be fully fabricated with large circuit elements pre-connected at one end, where the circuit elements otherwise would be unable to pass through the hole. The circuitry 26 is shown as a circuit board having a multitude of conductive contacts 90 for connection by the wires, and to provide connection to other circuitry in an associated instrument.

FIG. 2 shows the cable terminal as assembled. The threaded portion 45 of the insert 40 of the flex relief element 42 is inserted in the hole 86 of the panel 22, with the shoulder 46 against the panel. The nut 24 is tightened against the opposite side of the panel, securing the insert against rotation. The cup element 16 is inserted with the rib 74 mated with the groove 52 of the insert. The wires 30 of the cable extend through the boot, insert, cone and cup bores, and connect to circuitry 26. The shield 32 and sheath or jacket 34 are captured and pinched between the tapered surfaces of the cone and cup.

The assembly is constructed by installing the cup in the flex relief insert, then passing the cable through the bore to expose the cable end. The cable jacket is stripped to expose adequate length of wire, and slitted. The cone is then placed over the wires, and underneath the jacket and shield. The cable is then pulled in the direction away from the wire ends to seat the jacket-shrouded cone in the cup. In this condition, the cable assembly may be shipped to an instrument manufacturer for installation in an instrument.

Installation proceeds with insertion of the wires and threaded insert portion through the panel hole, and passing the nut over the wires and tightening it to the threaded insert. For installations in which the nut is integral with the hole, the flex relief element rotates freely with respect to the cup, cone, and pinched cable, so that it may be rotated numerous times as it is threaded in place, without twisting the cable. Such twisting would be disadvantageous when the opposite end of the cable is already connected to another instrument.

Installation proceeds with connection of the wires to the circuitry. In other embodiments, the wires may be pre-attached to connectors that are narrow enough to pass through the panel hole. In yet others, the panel may be a split clamshell-type discussed above, so that larger connectors may be pre-installed by the cable manufacturer be fore shipping and installation.

In the preferred embodiment, the cone and cup are formed of polyether sulfone plastic. The cone has an outer diameter of 0.453", and a length of 0.350". The taper angle of the cone matches the taper angle of the cup bore. In the preferred embodiment, the half-angle is 7 degrees from the axis, for a total angle of 14 degrees. In alternative embodiments, the half-angle may range between 3.5 and 10 degrees. Below the lower limit, the cone may require excessive length to generate a needed diameter differential over its length. Such differential is necessary to accommodate variations in jacket thickness, and to avoid drawing the cone entirely through the cup. Above the upper limit, tension on the jacket fails to tighten the grip adequately, and the jacket may slip from the cone/cup interface, defeating the function of the assembly. The cone tapers and narrows in the direction from which the cable extends, so that tension on the exposed cable will tighten the grip. The grip does not rely on a pre-set tension, such as might be provided by a manually tightened clamp. This avoids the disadvantage that such clamps may be over or under tightened. In the preferred embodiment, the wedging geometry of the tapers generates compressive force proportional to applied tension, and only limited compression at other times. In addition, with the jacket extending essentially straight over the cone, without requiring crimping, folding, or rolling back on itself, installation is simplified, and the diameter of the connector is minimized.

When the installed cable is subject to tension, the jacket is compressed between the cup and cone, while the inner wires are slack, due to their loose fit in the jacket, and extra slack left at the connection end. In response to tension, the PVC jacket stretches in the manner of a spring, absorbing some tension and damping brief impulsive loads. Greater loads are handled by the braided shield, which includes wire elements that wrap helically in both directions about the wires. As the jacket is stretched, the helical braid necks down to generate compression about the wires, without harming the wires. As the tension is released, the resilient nature of the jacket restores the cable to its original length, expanding the shield braid to its original diameter, restoring the looseness of the wires in the jacket for flexibility.

Figure 3:
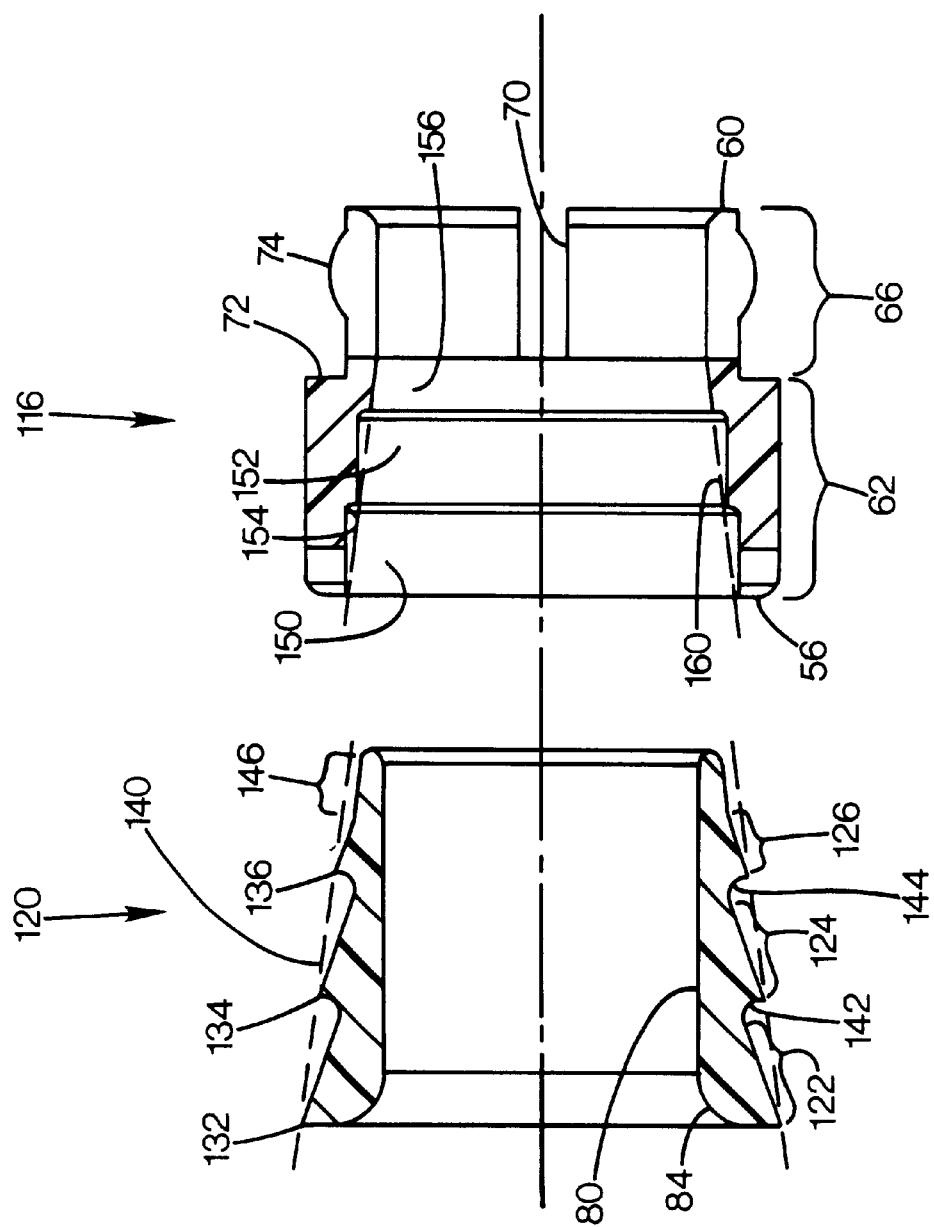
FIG. 3 is an exploded perspective view of selected components according to an alternative embodiment of the invention.

FIG. 3 shows an alternative embodiment cup 116 and cone 120 that are essentially the same as in the preferred embodiment described above, except for the exterior surface of the cone, and interior surface of the cup. In contrast to the smooth frustoconical surfaces of the preferred embodiment, the alternative of FIG. 3 has stepped or barbed surfaces that reduce in diameter over the length of the overall surfaces.

The exterior of the cone has three frustoconical segments 122, 124, 126, each having a taper half angle of 19 degrees. Each segment has a wide end 132, 143, 136 facing away from the cup. Because the half angles of the segments exceed that of the overall taper profile 140, the narrower ends of segments 122 and 124 are stepped with respect to the respective ends 134, 136 of the adjacent segments. These steps are in the form of undercut grooves 142, 144, which allow the end edges to flex inwardly slightly in response to inward radial force. A gently tapered nose portion 146 has a taper half angle of 7 degrees, equal to the overall half angle 140.

As also shown in FIG. 4, the cup bore includes a first cylindrical portion 150, a second cylindrical portion 152 having a smaller diameter than the first portion to provide a shoulder 154 at the junction. Although the bore portions are described as cylindrical, these have a minimal taper to provide a draft angle to facilitate injection molding of this plastic part. A third portion 156 is tapered to mate with a half angle of 7 degrees, to match that of the cone nose portion 146.

The steps provide an overall profile 160 with a half angle of 7 degrees, matching that of the cone's overall profile 140. The first bore portion 150 has a diameter greater than the diameter of cone edge 134 by an amount selected based on the wall thickness of the jacket and shield to be captured therebetween. The separation between these features is slightly smaller than the jacket and shield thickness, so that moderate compression of the jacket and shield will generate friction that resist extraction of the cone from the cup, to avoid unintended loosening of the grip. The barbed edge 136 and bore portion 152 are similarly sized with respect to each other. In addition, the slightly flexible barb edged 134 and 136 flex to accommodate the jacket thickness compressively. Further, the barbs with their undercuts help to prevent the extraction of the cone from within the jacket, as the barbs tend to dig into the shield material.

Essentially, the barb presses the jacket outward against the nearly cylindrical bore portion, so that there is no tendency toward loosening, even when moderate axial force from the cable is applied. The lack of an increasing taper once the shoulder is cleared by a barb eliminates the tendency of the cone to disengage from the cup during handling or when there is a pushing of the sheath in reverse. As tension is further increased on the jacket, the shield braid tends to drag the cone into the cup towards the next cup shoulders. The outer jacket tends to be retained by the ridges on the cup. Since the jacket is a flexible member it provides somewhat of a "ramp" for the braid and cone to compress as it approaches the next ridge.

While the above is discussed in terms of preferred and alternative embodiments, the invention is not intended to be so limited.

What is claimed is:

1. A cable assembly comprising:
    a cable comprising a core surrounded by a sheath;
    a cone element defining a bore receiving the core;
    the cone having a tapered exterior surface;
    at least a portion of the cone being received within the sheath;
    a cup defining a tapered cup bore receiving the sheath and the core;
    a portion of the sheath captured between the exterior of the cone and the cup bore; and
    the cone defining an axis and having a axial length, and wherein the tapered exterior surface of the cone extends the entire axial length of the cone.

2. The assembly of claim 1 wherein the cone has a large end and a small end, and the small end extends toward an intermediate portion of the cable and away from a free end of the cable adjacent the cone.

3. The assembly of claim 1 wherein the cup is connected to a housing.

4. The assembly of claim 1 including a connector element defining a bore receiving the cable and rotatably connected to the cup, and having a threaded portion for connection to a housing, such that rotation of the connector element does not twist a cable connected to the cup.

5. The assembly of claim 1 wherein the cone exterior and cup bores are frustoconical surfaces.

6. The assembly of claim 1 wherein the cable sheath includes an outer jacket and an inner shield, and wherein the jacket and shield are clamped together between the cone and cup.

7. The assembly of claim 1 wherein the cone entirely surrounds the core such that it is uninterrupted by a split and resists compression to a smaller diameter.

8. The assembly of claim 1 wherein the cup entirely surrounds the core such that it is uninterrupted by a split and resists expansion to a larger diameter.

9. The assembly of claim 1 wherein the cone has a frustoconical surface, and the portion of the frustoconical surface having the largest diameter comprises the largest diameter portion of the cone.

10. The assembly of claim 2 wherein the cup bore has a small diameter end extending away from the free end.

11. The assembly of claim 4 wherein the connector element includes a resilient flex relief sleeve defining a bore receiving the cable.

12. The assembly of claim 5 wherein the frustoconical surfaces have a common taper angle.

13. The assembly of claim 5 wherein the cone has a taper half angle of less than 10 degrees, such that tension on the cable with respect to the cup generates compression of the sheath between the cone and the cup.

14. A cable assembly comprising:
    a cable comprising a core surrounded by a sheath;
    a cone element defining a bore receiving the core;
    the cone having an exterior surface having a smaller diameter at one end than at the other end;
    the entire cone being received within the sheath;
    a cup defining a cup bore receiving the sheath and the core, the bore of the cup having a smaller diameter at one end than at the other end;
    a portion of the sheath captured between the exterior of the cone and the cup bore;
    the one end of the cone having an exterior surface having a smaller diameter, and the one end of the large end of the bore of the cup having a smaller diameter, extending in a common direction; and
    wherein the smaller diameter end of the cone extends toward an intermediate portion of the cable and away from a free end of the cable adjacent the cone.

15. The assembly of claim 14 wherein the cup bore has a small diameter end extending away from the free end.

16. The assembly of claim 14 wherein the cup is connected to a housing.

17. The assembly of claim 14 including a connector element defining a bore receiving the cable and rotatably connected to the cup, and having a threaded portion for connection to a housing, such that rotation of the connector element does not twist a cable connected to the cup.

18. The assembly of claim 14 wherein at least one of the cone exterior surface and cup bore is stepped.

19. The assembly of claim 14 wherein at least one of the cone exterior surface and cup bore includes tapered segments.

20. The assembly of claim 14 wherein the cable sheath includes an outer jacket and an inner shield, and wherein the jacket and shield are clamped together between the cone and cup.

21. The assembly of claim 14 wherein the cone has a tapered surface, and the portion of the tapered surface having the largest diameter comprises the largest diameter portion of the cone.

22. A cable assembly comprising:

a cable comprising a core surrounded by a sheath;

a cone element defining a bore receiving the core;

the cone having a tapered exterior surface;

at least a portion of the cone being received within the sheath;

a cup defining a tapered cup bore receiving the sheath and the core;

a portion of the sheath captured between the exterior of the cone and the cup bore;

a largest diameter portion of the tapered exterior surface of the cone comprising the largest diameter portion of the entire cone; and the cone having a smaller diameter end extending toward an intermediate portion of the cable and away from a free end of the cable adjacent the cone.

23. The cable assembly of claim 22 wherein the cone defines an axis and has a axial length, and wherein the cone has a frustoconical surface extending the entire axial length of the cone.

24. The cable assembly of claim 22 wherein the cup is connected to a housing.

25. The cable assembly of claim 22 including a connector element defining a bore receiving the cable and rotatably connected to the cup, and having a threaded portion for connection to a housing, such that rotation of the connector element does not twist a cable connected to the cup.

26. The cable assembly of claim 22 wherein at least one of the cone exterior surface and cup bore is stepped.

* * * * *